UNITED STATES PATENT OFFICE.

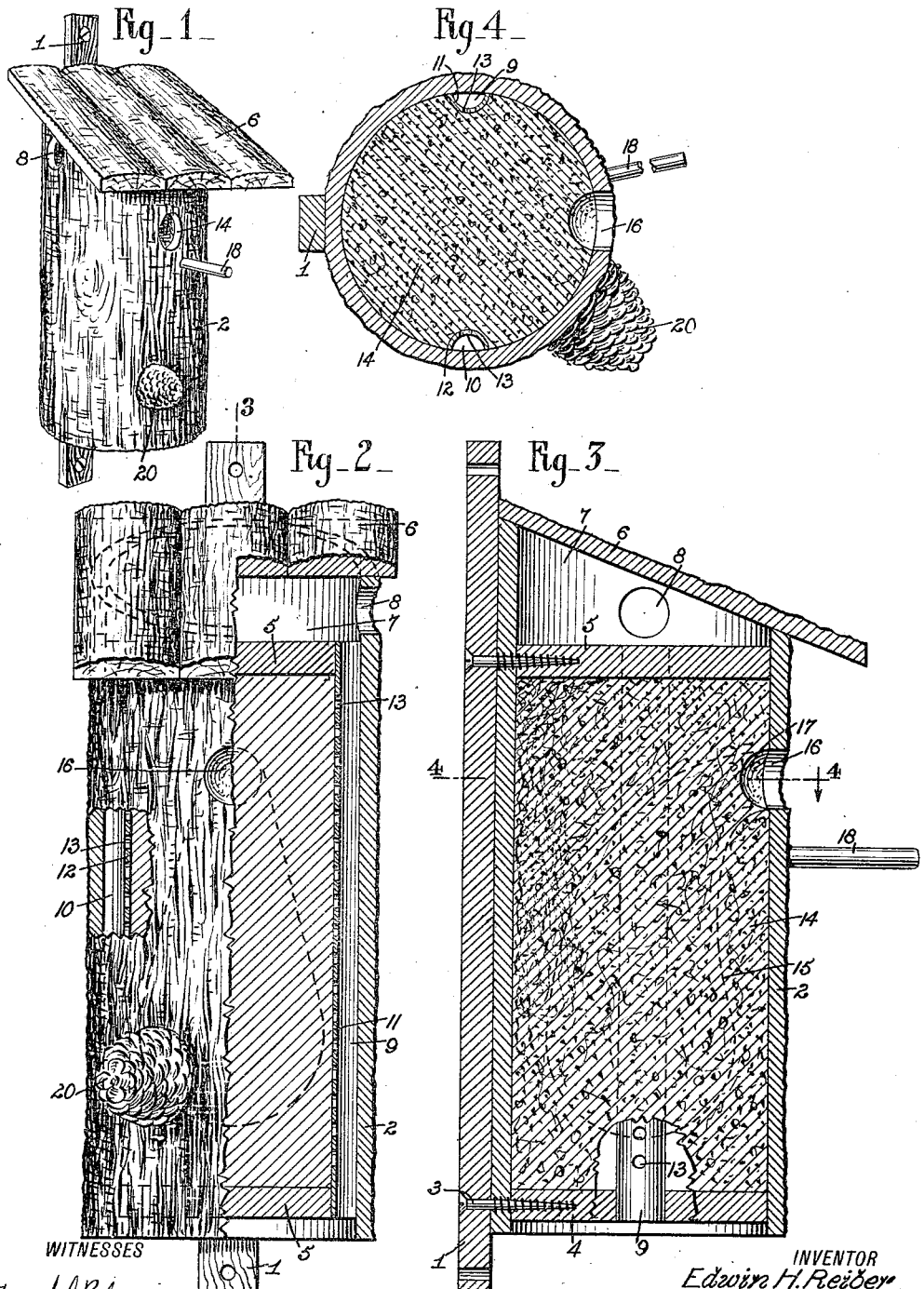

EDWIN H. REIBER, OF WEST WEBSTER, NEW YORK.

BIRD-HOUSE.

1,230,780.  Specification of Letters Patent.  Patented June 19, 1917.

Application filed March 22, 1917. Serial No. 156,547.

*To all whom it may concern:*

Be it known that I, EDWIN H. REIBER, a citizen of the United States, and a resident of West Webster, in the county of Monroe and State of New York, have invented a new and Improved Bird-House, of which the following is a full, clear, and exact description.

This invention relates to an improved construction for bird houses and has for an object the provision of means which will respond to or comply with the habits of birds so that, though the house is artificial, it will supply a substantially natural environment.

Another object in view is to provide an artificial or manufactured house with a protecting natural outer coating or shell and a prepared comparatively loose body adapted to be removed by the birds when forming their nest.

A still further object in view is to provide a construction especially adapted for woodpeckers and, later, to any kind of nesting birds, the structure being such that the environment will be substantially natural while the birds will be required to remove certain parts for producing the particular shaped nesting cavity desired.

In the accompanying drawing:—

Figure 1 is a perspective view of a bird house disclosing an embodiment of the invention.

Fig. 2 is a front elevation of the structure shown in Fig. 1, the same being shown on an enlarged scale with certain parts broken away.

Fig. 3 is a sectional view through Fig. 2 on line 3—3.

Fig. 4 is a transverse sectional view through Fig. 3 on line 4—4.

Referring to the accompanying drawing by numerals, 1 indicates a supporting board or member of any kind to which the shell or casing 2 is secured by any suitable means, as for instance, by screws 3 as shown in Fig. 2. The screws 3 in addition to holding the shell 2 in position also hold the bottom 4 and the top 5 in position. The shell 2 may be of any shape, preferably substantially round in cross section, so as to simulate the shape of a tree. In addition, shell 2 is preferably made from wood which has the bark remaining thereon and from wood which will have a tendency to destroy or prevent vermin, as for instance, sassafras or red cedar.

In forming the casing or shell 2 the upper end is beveled so as to receive an inclined roof 6 whereby a chamber 7 may be produced, said chamber having an opening 8 for allowing a circulation of air. Air from chamber 8 is in free communication with the passageways 9 and 10, which passageways are produced by the shell 2 and semi-tubular members 11 and 12, said semi-tubular members being preferably metal and provided with a plurality of perforations 13 so that air and moisture may be supplied to the filling 14. The filling 14 may be made from cork and moss, or other similar material, and packed reasonably tight so as to provide a body for the woodpecker to remove when forming his nest cavity 15, as shown in dotted lines in Fig. 3. In order to assist and to direct the woodpecker in making his own home an opening 16 is provided in the shell or casing 2 and a slight depression 17 is also provided, though this is not absolutely necessary.

In making houses for woodpeckers, as well as in the manufacture of other kinds of houses, it is well to supply a house answering the natural instincts of the birds, and in following this theory the use of the filling 14 is very desirable, as it causes the woodpecker to peck out the soft material in the shell 2 in a manner similar to the way he removes the soft or decayed wood in a dead limb or a dead tree. Ordinarily, under natural conditions, the woodpecker will select a dead tree or limb which has a comparatively solid bark or outer shell while the interior is in a decayed condition. After pecking through the outer shell the woodpecker produces the desired sized cavity and then uses the same as a nest for hatching the young and rearing the young. The selection of decayed wood is to provide a proper environment or condition for the eggs, namely, a moist surrounding medium for properly moistening the eggs during the incubating period so that the birds when hatched will be in a strong, healthy condition.

In providing the construction shown in the drawing and particularly disclosed in Fig. 3, means have been provided which answers the peculiar requirements of the woodpecker, namely, the soft moist material 14 which may be comparatively easily removed and which will provide a proper condition for the eggs. In addition, the shell 2 provides an outer casing which will protect the moist filling 14, while the passageways 9 and 10 allow the filling to absorb moisture from the cooled air so as to maintain the entire structure in proper condition closely resembling the natural condition desired by birds of this kind. After the young of the woodpecker have been hatched and the woodpeckers have left the nest, other nesting birds may use the nest cavity for rearing their young, because the conditions are equally good for hatching of the eggs. Usually, if not always, the woodpeckers use a nest once only, so that other nesting birds freely use these forms of nests, and by reason of the particular material used, vermin is prevented so that nesting birds may use the nests more or less continually for a long time. To assist in providing a proper roost for the birds a branch or pin 18, preferably of wood, is provided near opening 16. A natural cone or a food cone 20 may be supplied at some convenient point on the shell 2.

What I claim is:

1. A bird house comprising a comparatively solid shell having an opening at one point, a comparatively soft filling for said shell, and a roof spaced from said filling.

2. A bird house comprising a comparatively hard wood casing having an opening near the top thereof, a top member and a bottom member arranged in said casing, a filling of finely divided wood arranged in said casing between said ends whereby the bird may pick out any part of said filling desired for forming a nest cavity, and means for admitting air to said filling so that the filling may absorb moisture.

3. A bird house comprising a comparatively solid shell, a comparatively soft filling having an opening at one point, and means for providing ventilation for said filling.

4. A bird house comprising a shell, having an opening near the upper part, a solid comparatively hard top member and a bottom member fitting the interior of said shell, a filling of cork and moss within said shell between said top and bottom whereby a bird may remove the filling through said opening and form a nest cavity, and means for admitting air to said filling so that the filling may absorb moisture.

5. A bird house comprising a comparatively hard wood casing having an opening near the top thereof, a top member and a bottom member arranged in said casing, a filling of finely divided wood arranged in said casing between said ends whereby the bird may pick out any part of said filling desired for forming a nest cavity, an inclined roof arranged above said top end member whereby a chamber is produced, said casing being formed with an opening merging into said chamber, and a passageway leading from said chamber formed with openings communicating with the filling in said casing whereby air from said chamber may transmit moisture to said filling.

6. A bird house comprising a casing of wood having an opening, a top member and a bottom member arranged in said casing, a filling between said top and bottom members comprising cork and moss, an inclined roof for said casing whereby an open chamber is provided above said top member, said casing having an opening entering into said chamber, and a plurality of semi-tubular members extending from said chamber interiorly of said casing from near the top to near the bottom thereof, said semi-tubular members having apertures therein for permitting the filling to absorb moisture from the air.

EDWIN H. REIBER.

Copies of this patent may be obtained for five cents each, by addressing the "Commissioner of Patents, Washington, D. C."